United States Patent
Brown et al.

(10) Patent No.: US 11,256,964 B2
(45) Date of Patent: Feb. 22, 2022

(54) RECURSIVE MULTI-FIDELITY BEHAVIOR PREDICTION

(71) Applicant: QUALCOMM Incorporated, San Diego, CA (US)

(72) Inventors: Kyle Jordan Brown, Stanford, CA (US); Mihir Jain, Amsterdam (NL); Ahmed Kamel Sadek, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 196 days.

(21) Appl. No.: 16/599,078

(22) Filed: Oct. 10, 2019

(65) Prior Publication Data
US 2020/0117958 A1    Apr. 16, 2020

Related U.S. Application Data

(60) Provisional application No. 62/744,415, filed on Oct. 11, 2018.

(51) Int. Cl.
| | |
|---|---|
| *G06K 9/62* | (2006.01) |
| *G06N 3/08* | (2006.01) |
| *G06K 9/46* | (2006.01) |
| *G06N 7/00* | (2006.01) |

(52) U.S. Cl.
CPC ......... *G06K 9/6276* (2013.01); *G06K 9/4604* (2013.01); *G06K 9/6219* (2013.01); *G06K 9/6231* (2013.01); *G06N 3/08* (2013.01); *G06N 7/005* (2013.01)

(58) Field of Classification Search
CPC .. G06K 9/6276; G06K 9/4604; G06K 9/6219; G06K 9/6231; G06N 3/08; G06N 7/005
See application file for complete search history.

(56) References Cited

U.S. PATENT DOCUMENTS

| | | | |
|---|---|---|---|
| 2015/0336579 A1* | 11/2015 | Yoshizawa | B60T 7/12 701/70 |
| 2017/0210379 A1* | 7/2017 | Obata | B60W 30/0956 |

OTHER PUBLICATIONS

G. Xie, H. Gao, L. Qian, B. Huang, K. Li and J. Wang, "Vehicle Trajectory Prediction by Integrating Physics- and Maneuver-Based Approaches Using Interactive Multiple Models," in IEEE Transactions on Industrial Electronics, vol. 65, No. 7, pp. 5999-6008, Jul. 2018, doi: 10.1109/TIE.2017.2782236. (Year: 2018).*

W. Schwarting and P. Paschcka, "Recursive conflict resolution for cooperative motion planning in dynamic highway traffic," 17th International IEEE Conference on Intelligent Transportation Systems (ITSC), 2014, pp. 1039-1044, doi: 10.1109/ITSC.2014.6957825. (Year: 2014).*

(Continued)

*Primary Examiner* — Fayyaz Alam
(74) *Attorney, Agent, or Firm* — Seyfarth Shaw LLP

(57) ABSTRACT

A method for predicting a future action of agents in a scene includes assigning a fidelity level to agents observed in the scene. The method also includes recursively predicting future actions of the agents by traversing the scene. A different forward prediction model is used at each recursion level. The method further includes controlling an action of an ego agent based on the predicted future actions of the agents.

28 Claims, 14 Drawing Sheets

(56) References Cited

OTHER PUBLICATIONS

Albrecht S.V., et al., "Autonomous Agents Modelling Other Agents: A Comprehensive Survey and Open Problems," arxiv.org, Cornell University Library, 201 Olin Library Cornell University Ithaca, NY 14853, Sep. 23, 2017 (Sep. 23, 2017), XP081318849, DOI: 10.1016/J.ARTINT.2018.01.002, 46 pages, the whole document.

Camerer C.F., et al., "A Cognitive Hierarchy Model of Games," Quarterly Journal of Economics, vol. 119 (3), Aug. 1, 2004 (Aug. 1, 2004), 38 pages, XP055659047, US, ISSN: 0033-5533, DOI: 10.1162/0033553041502225, the whole document.

Galceran E., et al., "Multipolicy Decision-making for Autonomous Driving via Changepoint-based Behavior Prediction: Theory and Experiment," Autonomous Robots, Kluwer Academic Publishers, Dordrecht, NL, vol. 41 (6), Feb. 9, 2017 (Feb. 9, 2017), pp. 1368-1379, XP036268382, ISSN: 0929-5593, DOI: 10.1007/S10514-017-9619-Z [retrieved on Feb. 9, 2017] abstract p. 1368—p. 1379.

International Search Report and Written Opinion—PCT/US2019/055887—ISA/EPO—dated Jan. 29, 2020.

Li N., et al., "Hierarchical Reasoning Game Theory based Approach for Evaluation and Testing of Autonomous Vehicle Control Systems," 2016 IEEE 55th Conference on Decision and Control (CDC), IEEE, Dec. 12, 2016 (Dec. 12, 2016), pp. 727-733, XP033030378, DOI: 10.1109/CDC .2016.7798354, [retrieved on Dec. 27, 2016], abstract figures 1-2, Algorithms 1 and 2; paragraph [000I]—paragraph [0V. B] paragraph [00VI].

Park S.H., et al., "Sequence-to-Sequence Prediction of Vehicle Trajectory via LSTM Encoder-Decoder Architecture," 2018 IEEE Intelligent Vehicles Symposium, (IV), IEEE, Jun. 26, 2018 (Jun. 26, 2018), pp. 1672-1678, XP033423538, DOI: 10.1109/IVS.2018.8500658, [retrieved on Oct. 18, 2018], 7 pages, the whole document.

Deo N., et al., "Convolutional Social Pooling for Vehicle Trajectory Prediction", The IEEE Conference on Computer Vision and Pattern Recognition (CVPR) Workshops, 2018, pp. 1468-1476.

* cited by examiner

RECURSIVE MULTI-FIDELITY BEHAVIOR PREDICTION

CROSS-REFERENCE TO RELATED APPLICATION

This application claims the benefit under 35 U.S.C. § 119(e) to U.S. Provisional Patent Application No. 62/744,415, entitled "RECURSIVE MULTI-FIDELITY BEHAVIOR PREDICTION," filed on Oct. 11, 2018, the disclosure of which is expressly incorporated by reference herein in its entirety.

BACKGROUND

Field

Aspects of the present disclosure generally relate to behavior prediction and, more particularly, to systems and methods for recursive behavior prediction.

Background

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

CNNs may also be used for behavior prediction. Autonomous and non-autonomous vehicles may use a CNN to predict behaviors between agents, such as other vehicles. For example, autonomous vehicles use behavior prediction for planning and decision-making. It is desirable to improve behavior prediction systems for tasks, such as autonomous driving.

SUMMARY

In one aspect of the present disclosure, a method is disclosed. The method may predict a future action of agents in a scene is disclosed. The method includes assigning a fidelity level to agents observed in the scene. The method also includes recursively predicting future actions of the agents by traversing the scene. The method further includes controlling an action of an ego agent based on the predicted future actions of the agents.

Another aspect of the present disclosure is directed to an apparatus including means for assigning a fidelity level to agents observed in the scene. The apparatus also includes means for recursively predicting future actions of the agents by traversing the scene. The apparatus further includes means for controlling an action of an ego agent based on the predicted future actions of the agents.

In another aspect of the present disclosure, a non-transitory computer-readable medium with non-transitory program code recorded thereon is disclosed. The program code may predict future actions of agents in a scene. The program code is executed by a processor and includes program code to assign a fidelity level to agents observed in the scene. The program code also includes program code to recursively predict future actions of the agents by traversing the scene. The program code further includes program code to control an action of an ego agent based on the predicted future actions of the agents.

Another aspect of the present disclosure is directed to an apparatus. The apparatus may predict future actions of agents in a scene. The apparatus has a memory and one or more processors coupled to the memory. The processor(s) is configured to assign a fidelity level to agents observed in the scene. The processor(s) is also configured to recursively predict future actions of the agents by traversing the scene. The processor(s) is further configured to control an action of an ego agent based on the predicted future actions of the agents.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
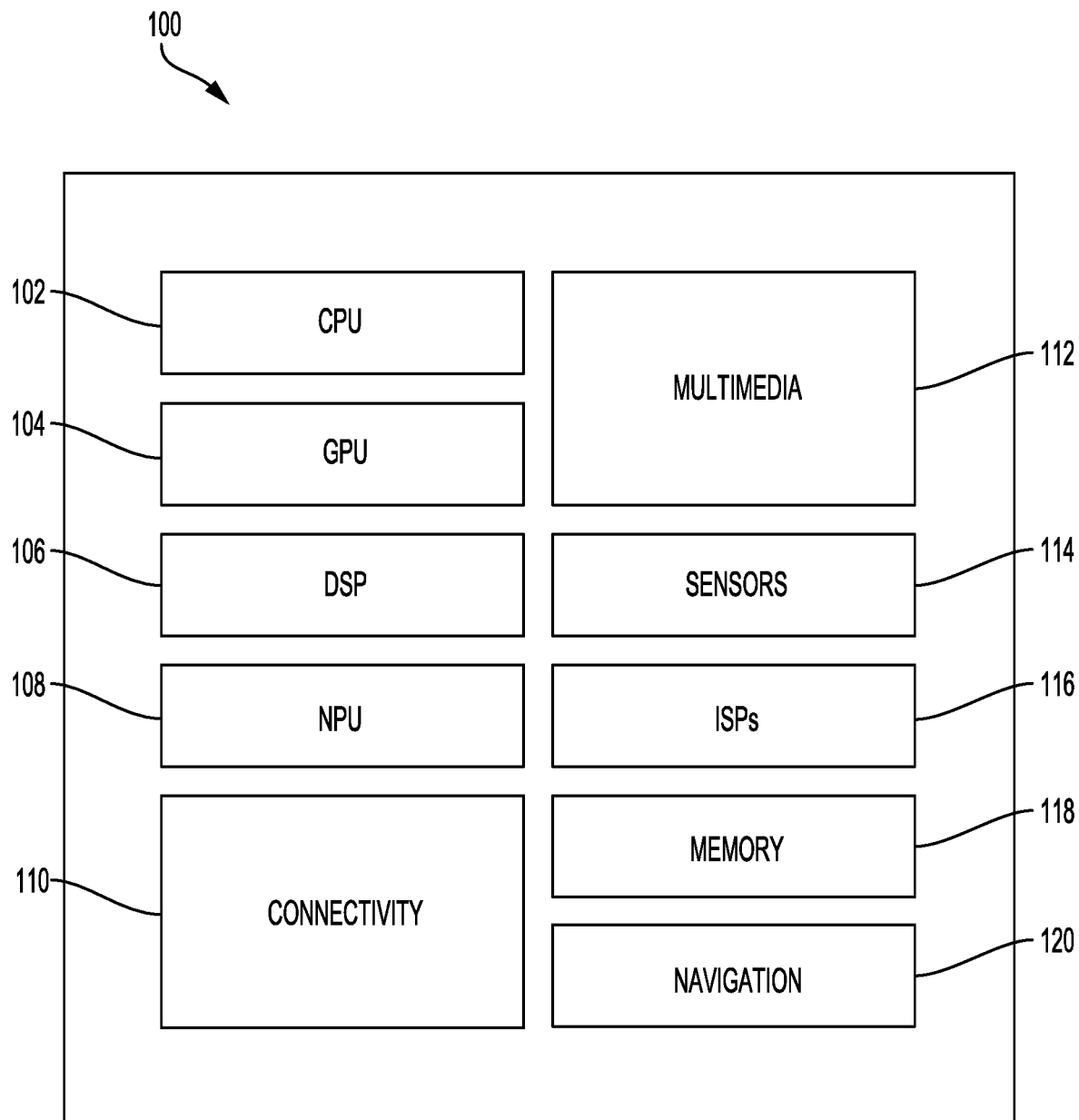
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Behavior prediction may be used in tasks involving interactions between decision-making agents. For example, autonomous vehicles use behavior prediction for planning and decision-making. In this example, the autonomous vehicle uses a behavior prediction system to predict behaviors of agents in an environment surrounding the autonomous vehicle. The autonomous vehicle may be referred to as an ego agent. The surrounding environment may include dynamic objects, such as autonomous agents. The surrounding environment may also include static objects, such as roads and buildings.

One or more sensors, such as a light detection and ranging (LIDAR) sensor, a radio detection and ranging (RADAR) sensor, a camera, and/or another type of sensor, may be used to capture a temporal snapshot (e.g., scene) of the environment. The temporal snapshot provides information about the state of the environment, such as a location of dynamic and static objects, at a given instant in time. Based on the temporal snapshot and one or more previous temporal snapshots, the behavior prediction system computes multiple scenarios (e.g., possible future evolutions of the scene).

Behavior prediction may be referred to as a task of estimating a posterior distribution over future trajectories of one or more dynamic agents in a scene. When planning a behavior of the ego agent, it is desirable to accurately predict the behavior of agents surrounding the ego agent. Predicting the behavior of surrounding agents may be difficult due to state and model uncertainty. State uncertainty refers to uncertainty in a location and/or velocity of an agent. Model uncertainty refers to uncertainty in a model of an agent's reasoning process.

The future behavior of both the ego agent and the other agents is interdependent. Due to this interdependency, behavior prediction may be difficult, especially in continuous state-, an action-, and/or observation-spaces. For example, highway driving can be modeled with continuous state-, action-, and observation-spaces. When traveling on the highway, the prediction model receives information from continuous observations of the actions of other agents while controlling actions of the ego agent.

Aspects of the present disclosure are directed to improving behavior prediction by combining a multi-fidelity framework into a recursive reasoning scheme. Multi-fidelity refers to predicting behaviors at various levels of fidelity. By using a multi-fidelity framework with a recursive reasoning scheme, aspects of the present disclosure may reduce a memory footprint and reduce the power consumption of a behavior prediction system for an ego agent.

A motion hypothesis refers to a representation of the predicted future trajectory of an agent. The motion hypothesis can be a single trajectory or a distribution over trajectories. An atomic prediction model is a model that receives an input of a representation of the history of a scene. The atomic prediction model may also receive a representation of the predicted future of a scene as an input. A motion hypothesis for a specific target vehicle is generated by the atomic prediction model. Atomic prediction models may vary in their level of prediction fidelity. The atomic prediction model may also be referred to as a policy.

Each agent in the scene may be assigned a reasoning level and a set of atomic prediction models. The reasoning level of an agent is an integer greater than or equal to zero. Each atomic prediction model from an agent's assigned set of atomic prediction models corresponds to a specific reasoning level greater than or equal to zero and less than or equal to the agent's assigned reasoning level. A given agent may have no more than one assigned atomic prediction model for each level.

For each agent that has an assigned level 0 atomic prediction model, the recursive reasoning scheme generates a level 0 motion hypothesis using the assigned level 0 atomic prediction model. For each agent with an assigned level 1 atomic prediction model, the recursive reasoning scheme generates a level 1 motion hypothesis using the assigned level 1 atomic prediction model. A subset of the level 0 motion hypotheses of other agents may be used as input to any of the level 1 prediction models. This process may be repeated, such that each successive set of motion hypotheses (level k) may be conditioned on the highest level (up to k−1) previously computed motion hypothesis of each agent in a subset of the other agents in the scene.

The multi-fidelity framework provides an ability to tune the fidelity at which each agent's behavior is predicted. In one configuration, the multi-fidelity framework allows for customization of the set of atomic policy models assigned to each agent. It may be desirable to tune the fidelity to adapt the model to the distribution of uncertainty that arises from the sensors used to collect environment information. For example, lower fidelity atomic prediction models may be desired for an agent whose motion history is not well defined in the scene history available to the model.

The multi-fidelity framework also provides for biasing the allocation of computational resources towards agents that are deemed most significant. That is, more computational resources may be allocated to agents with a higher significance in comparison to other agents in an environment. For example, the behavior of vehicles adjacent to an automated vehicle (e.g., ego agent) may be deemed more consequential to the prediction model's planning process than the behavior of vehicles that are farther away. As such, more computational resources may be allocated to processing information related to vehicles adjacent to the automated vehicle in comparison to the computational resources allocated to processing information related to other objects in the environment. Additionally, higher significant agents may generate an increased amount of information. As such, the additional computational resources may be used to process the additional information of the higher significant agents.

By conditioning on previously computed motion hypotheses, the model explicitly reasons about the future interaction between agents. The higher level motion hypotheses for a target vehicle may be conditioned on predictions for surrounding vehicles, which may, in turn, be conditioned on lower level motion hypotheses for the same target vehicle. The discussed conditioning may be referred to as a recursive scheme.

It is possible to generate predictions corresponding to multiple distinct possible scenarios which can be encoded by a scenario tree or a scenario forest. Multiple scenario trees may share common prediction nodes and fan out into intermediate and leaf nodes represented by higher levels of reasoning.

FIG. 1 illustrates an example implementation of a system-on-a-chip (SOC) 100, which may include a central processing unit (CPU) 102 or a multi-core CPU configured for recursive multi-fidelity behavior prediction, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the processor 102 may comprise code for assigning a fidelity level to agents observed in the scene. The processor 102 may also comprise code for recursively predicting future actions of the agents by traversing the scene. The processor 102 may further comprise code for controlling an action of an ego agent based on the predicted future actions of the agents.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still, higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
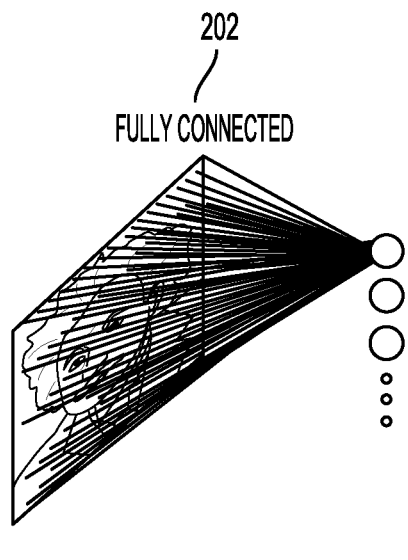
FIGS. 2A, 2B, and 2C are diagrams illustrating a neural network in accordance with aspects of the present disclosure.
Figure 2B:
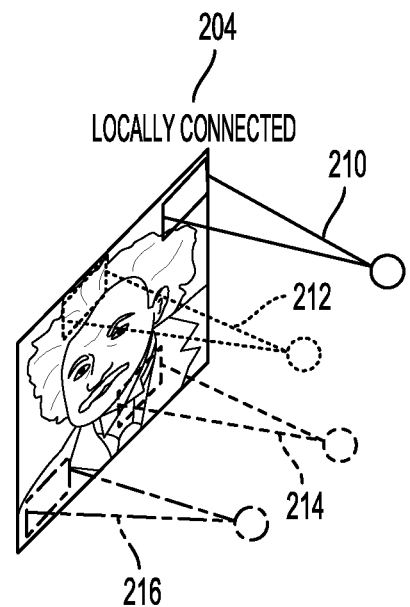

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
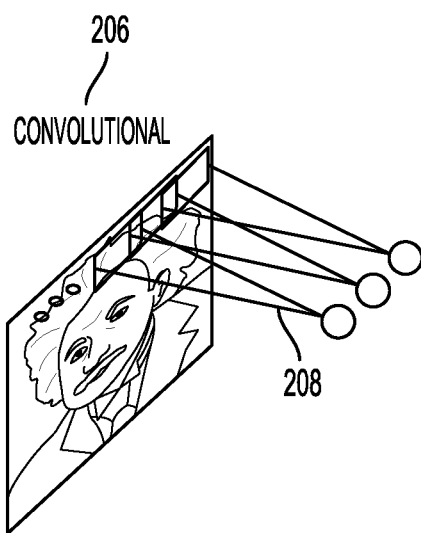

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
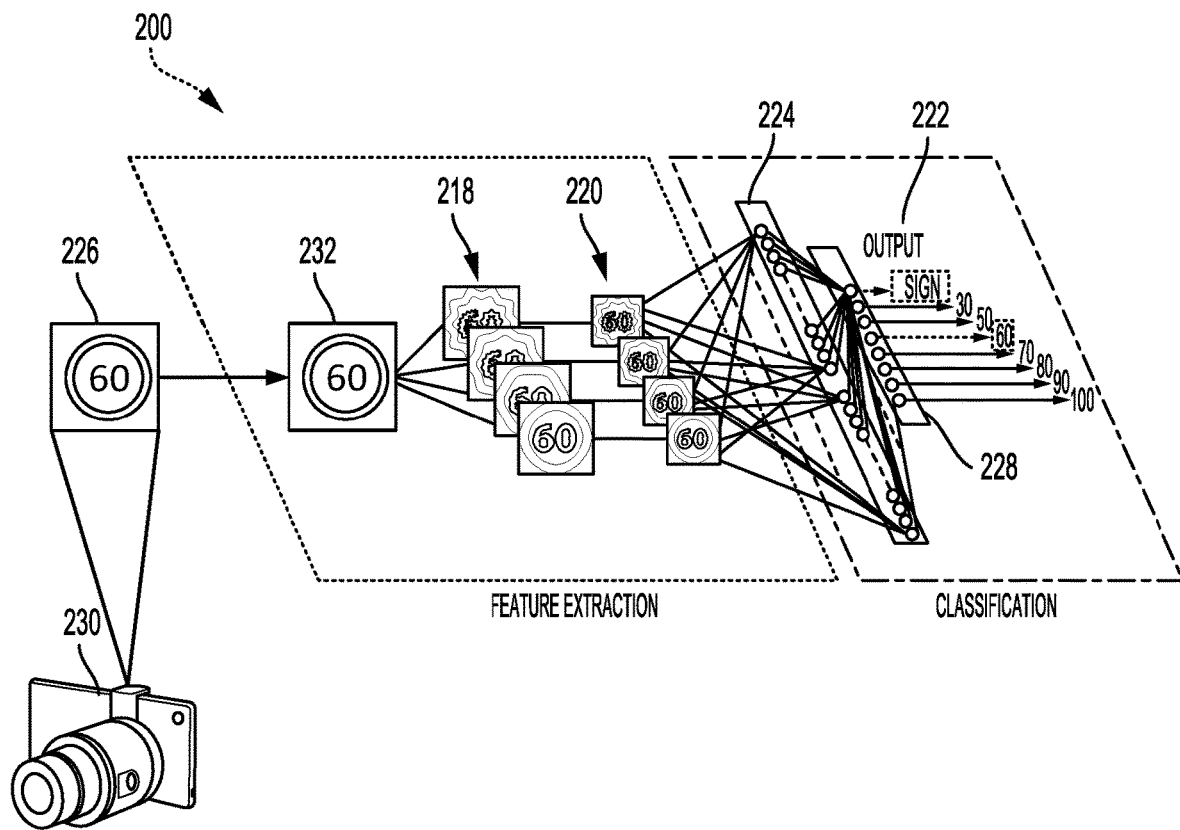
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
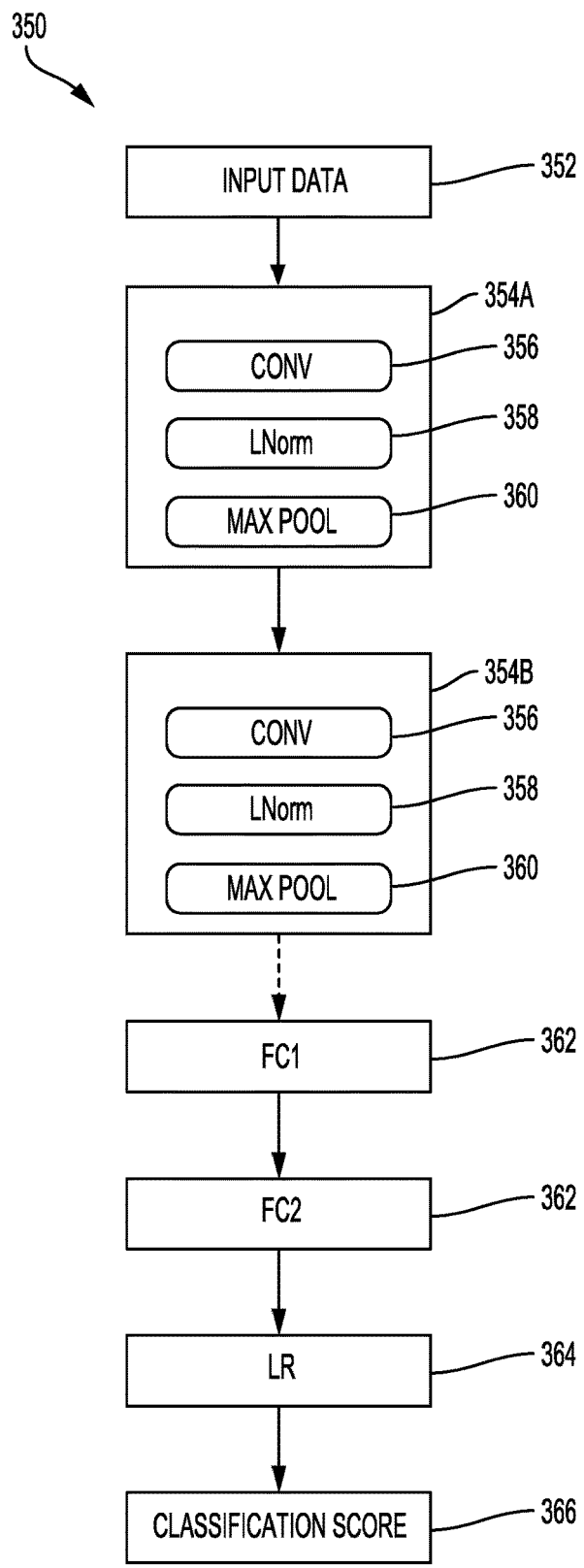
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In behavior prediction scenarios, the environment may exhibit structure (e.g., rules) that may be used to reduce a number of computations. For example, in an environment with many agents, each agent's behavior may be influenced principally by a subset of the surrounding agents. In driving, for example, adjacent vehicles may have a greater influence on a given vehicle's behavior in comparison to an influence from non-adjacent vehicles.

The environment's constraints may also suggest an intuitive order of action priority among the agents. For example, when driving, environmental constraints, such as traffic laws, local driving customs, and a roadway structure, may influence the order of action priority. As one example, local driving customs and/or traffic laws may dictate that a vehicle in front of other vehicles in the same lane has the right-of-way. In such cases, the behavior prediction model may be simplified by assuming that the follower vehicle reacts to the lead vehicle's actions, but the lead vehicle's actions are largely independent of the follower vehicle's actions.

The environmental constraints may be used to construct an interaction graph. Nodes of the graph represent agents. Directed edges of the graph encode a one-way dependent relationship between two nodes. In some instances, it may be appropriate to have a cyclic relationship between agents. Cyclic relationships refer to cases where the given agents' behaviors are considered interdependent. The interdependency does not prioritize one relationship over another.

Recursive predictions may be generated by traversing the interaction graph in order of priority. The predictions are recursive because higher level predictions for a target vehicle are conditioned on predictions for surrounding vehicles, which may be conditioned on lower level predictions for the same target vehicle. In one configuration, level 0 predictions are generated for agents with a higher priority than their direct neighbors in the interaction graph. Level 0 predictions may also be generated for agents that are part of a cyclic dependency relationship (e.g., the action of one agent is dependent on the action of another agent).

When a cyclic relationship exists between agents, recursive reasoning is used to generate predictions for interdependent agents. That is, the cyclic relationship is a property of the interaction graph, which is generated based on the structure exhibited by, or inferred about, the environment. Recursion may be used to manage cyclic dependencies. In a general case, when a structure of an environment is considered, it is assumed that every agent's behavior is conditioned on the behavior of every other agent. In this case, all relationships are cyclic.

Figure 4A:
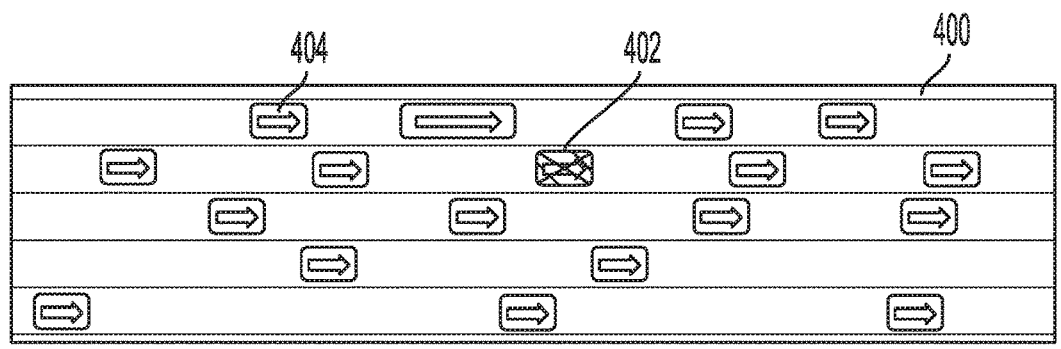
FIGS. 4A, 4B, and 4C illustrate examples of recursive multi-fidelity behavior prediction in accordance with aspects of the present disclosure.
Figure 4B:
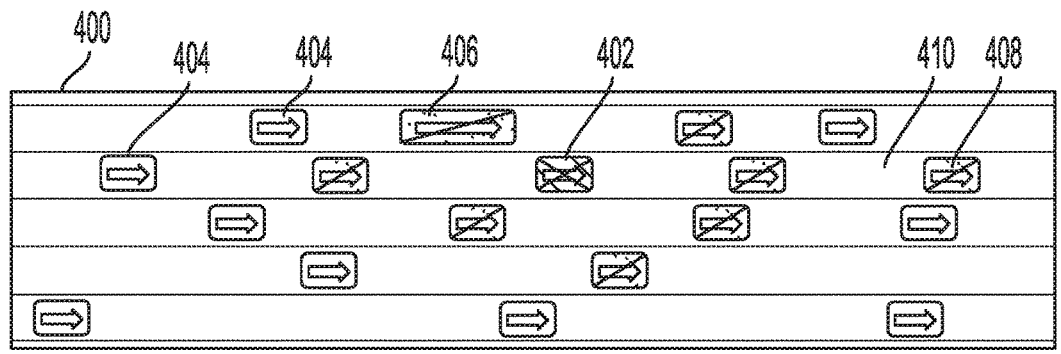
Figure 4C:
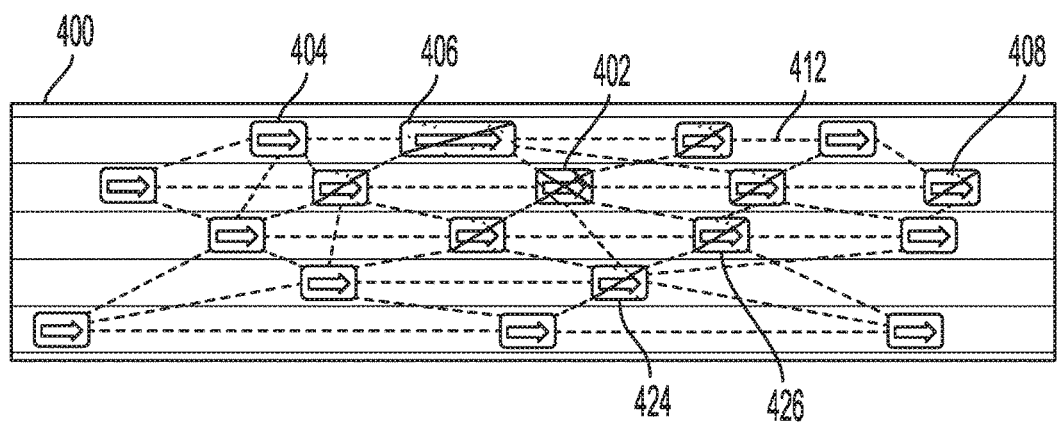

FIGS. 4A, 4B, and 4C illustrate examples of recursive multi-fidelity behavior prediction, according to aspects of the present disclosure. As shown in FIG. 4A, at a first time step, the prediction model receives information corresponding to an observation of a scene 400, such as vehicles on a multi-lane road. The scene 400 may be observed via one or more sensors of the ego agent 402, such as a LIDAR sensor, RADAR sensor, camera, and/or another type of sensor. Based on the observation, a prediction model (e.g., atomic prediction model) identifies the location of other objects in the scene, such as other agents 404. The observation may also identify each agent's direction of travel (identified via the arrow in FIG. 4A). An environment model is updated based on the observed scene 400.

As shown in FIG. 4B, after observing the scene 400, the prediction model assigns a reasoning level and a set of atomic prediction models to each of the observed agents 404. In one configuration, agents 406 adjacent to the ego agent 402 are assigned a higher fidelity level in comparison to the other agents 404. The adjacent agents 406 are a subset of the observed agents 404. The adjacent agents 406 are in a first pattern around the ego agent 402. The ego agent 402 is in a second pattern. Additionally, an agent 408 that is in front of other agents 404, 406 in a same lane 410 as the ego agent 402 may be assigned the higher fidelity level because actions of the other agents 404, 406 may be dependent on actions of the front agent 408. The front agent 408 is a subset of observed agents 404.

As shown in FIG. 4C, after assigning the fidelity levels, the prediction model generates an interaction graph to encode relationships between agents based on the structure of the environment. The interaction graph may also be generated before assigning fidelity levels. Directed edges (not shown in FIG. 4C) encode a direction of influence between two agents. A connection 412 between agents 404, 406, 408 identifies a constraint between two agents. In a directed graph, each edge includes a direction depicted with an arrow-tip (not shown in FIG. 4C). In the case of bi-directional relationships, the edge should have an arrow tip on both ends (not shown in FIG. 4C). That is, if the actions of a first agent 426 have an effect on a second agent 424 the edge should point from the first agent 426 to the second agent 424. The successive subsets of level 0, 1, . . . , K behavior predictions are selected by traversing the graph from highest to lowest priority.

According to aspects of the present disclosure, after generating the interaction graph, the model predicts level 0 scenarios for a set of agents. Each scenario corresponds to one motion hypothesis for each agent in the set of agents. As discussed above, for each agent that has an assigned level 0 atomic prediction model, the recursive reasoning scheme generates a level 0 motion hypothesis using the assigned level 0 atomic prediction model. The number of distinct predictions for each agent may be based on the prediction fidelity of the atomic prediction model.

Figure 5A:
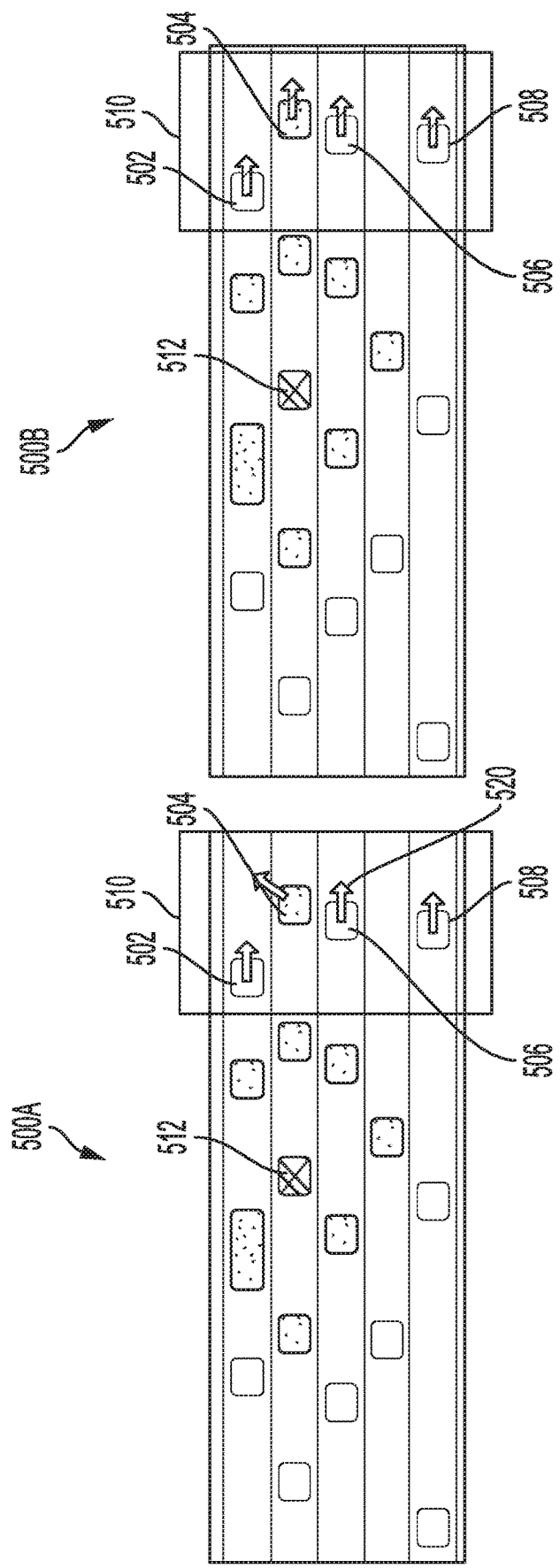
FIGS. 5A, 5B, and 5C illustrate examples of reasoning levels in accordance with aspects of the present disclosure

FIG. 5A illustrates an example of two distinct level 0 scenarios according to aspects of the present disclosure. As shown in FIG. 5A, scenarios 500A, 500B are generated for a first set of agents 510 (e.g., vehicles on a road). The first set of agents 510 includes four agents 502, 504, 506, 508. A fidelity level of a second agent 504 of the set of agents 510 is higher than a fidelity level of other agents 502, 506, 508 in the set of agents 510. An arrow 520 identifies a predicted movement of each agent 502, 504, 506, 508.

Figure 5B:
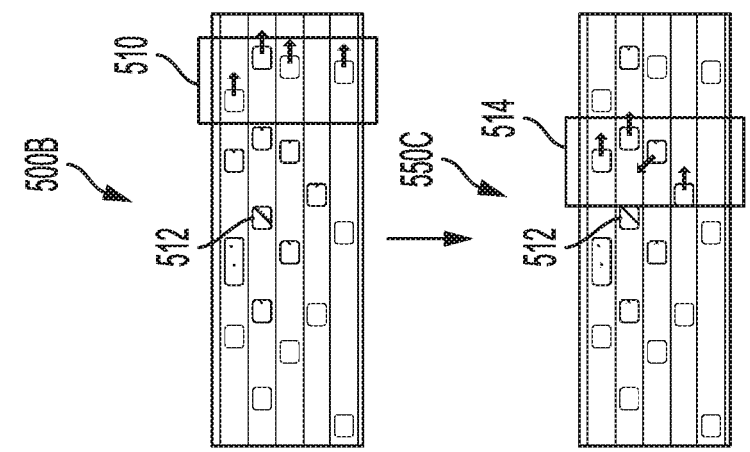
Figure 5B:
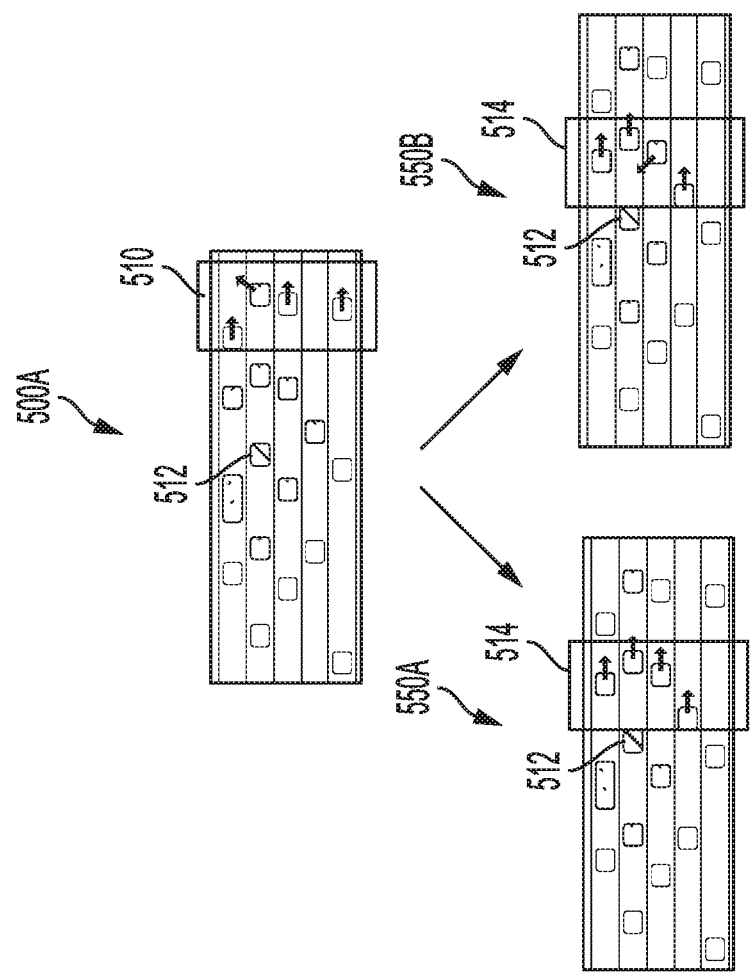

Based on the level 0 scenarios 500A, 500B, the prediction model generates level 1 scenarios for a second set of agents 514. FIG. 5B illustrates an example of generating level 1 scenarios 550A, 550B, 550C for the second set of agents 514 conditioned on the level 0 scenarios 500A, 500B. The predicted actions of each agent in the second set 514 are responses to the predicted actions for the first set of agents 510 in the first level 0 scenarios 500A, 500B. Each level 1 scenario 550A, 550B, 550C includes one predicted action for each agent within the second set 514. The predicted actions in each level 1 scenario 550A, 550B, 550C may be generated by a level 1 prediction model (see FIG. 7).

The prediction model continues generating scenarios for sets of agents. That is, the prediction model generates level 0 to level K scenarios. Each level k (k=0 to K) scenario is conditioned on a level k−1 scenario and scenarios of preceding levels. Specifically, each level k scenario is conditioned on the full chain of nodes from the root node to the parent node in the scenario tree. Additionally, any particular leaf node in the scenario tree is composed of the highest level prediction for each agent so far in the chain of ancestors all the way back to the root node.

Figure 5C:
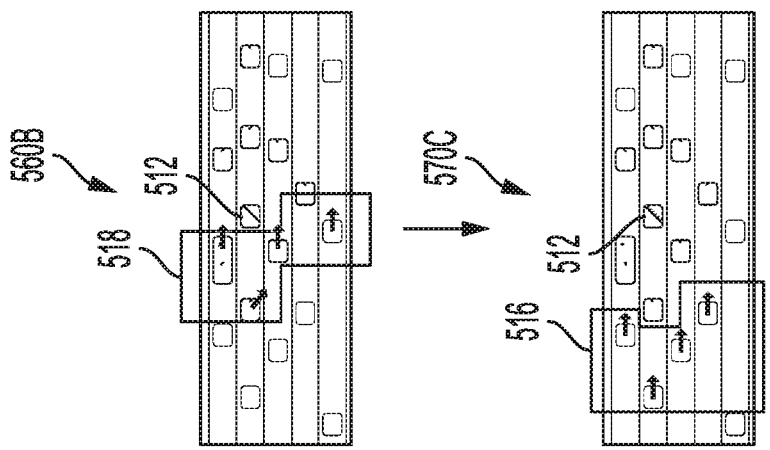
Figure 5C:
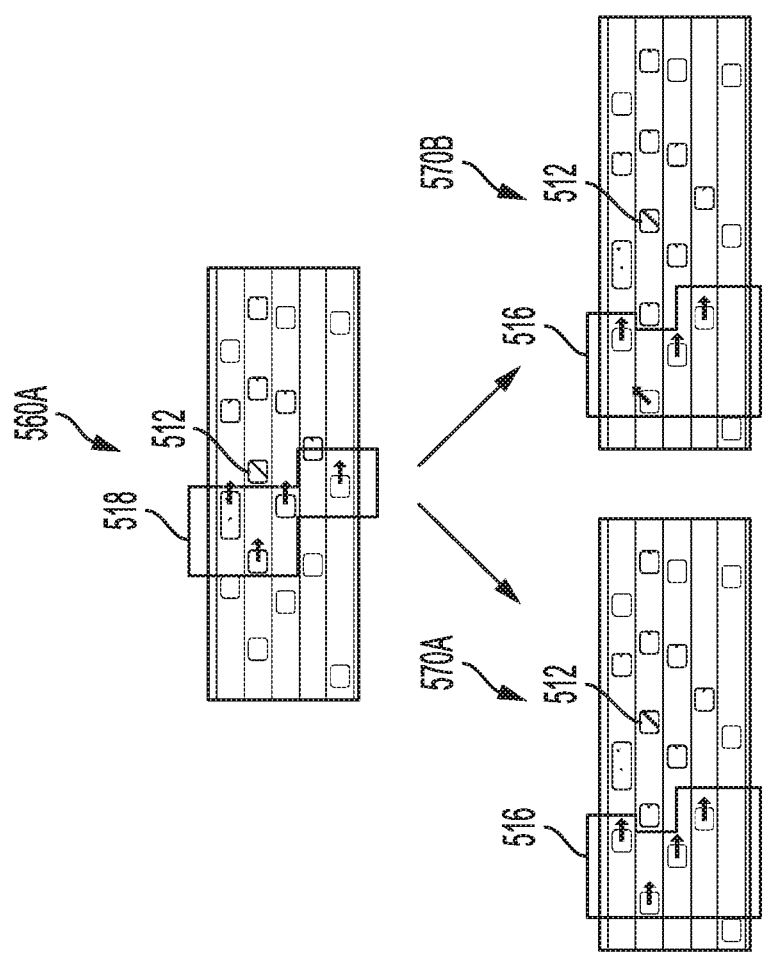

FIG. 5C illustrates an example of generating level k scenarios 570A, 570B, 570C for a fourth set of agents 516 conditioned on the level k−1 scenarios 560A, 560B. The predicted actions of each agent in the fourth set 516 are predicted responses to the predicted actions for a third set of agents 518 in the level k−1 scenarios 560A, 560B. Each level k scenarios 570A, 570B, 570C includes one predicted action for each agent within the fourth set 516. The predicted actions in each level k scenario 570A, 570B, 570C may be generated by a level k prediction model. One or more scenario trees may be generated based on the level 0-k scenarios. Each scenario tree encodes a particle-based representation of the joint distribution over possible future behaviors for the agents in the environment.

Figure 6:
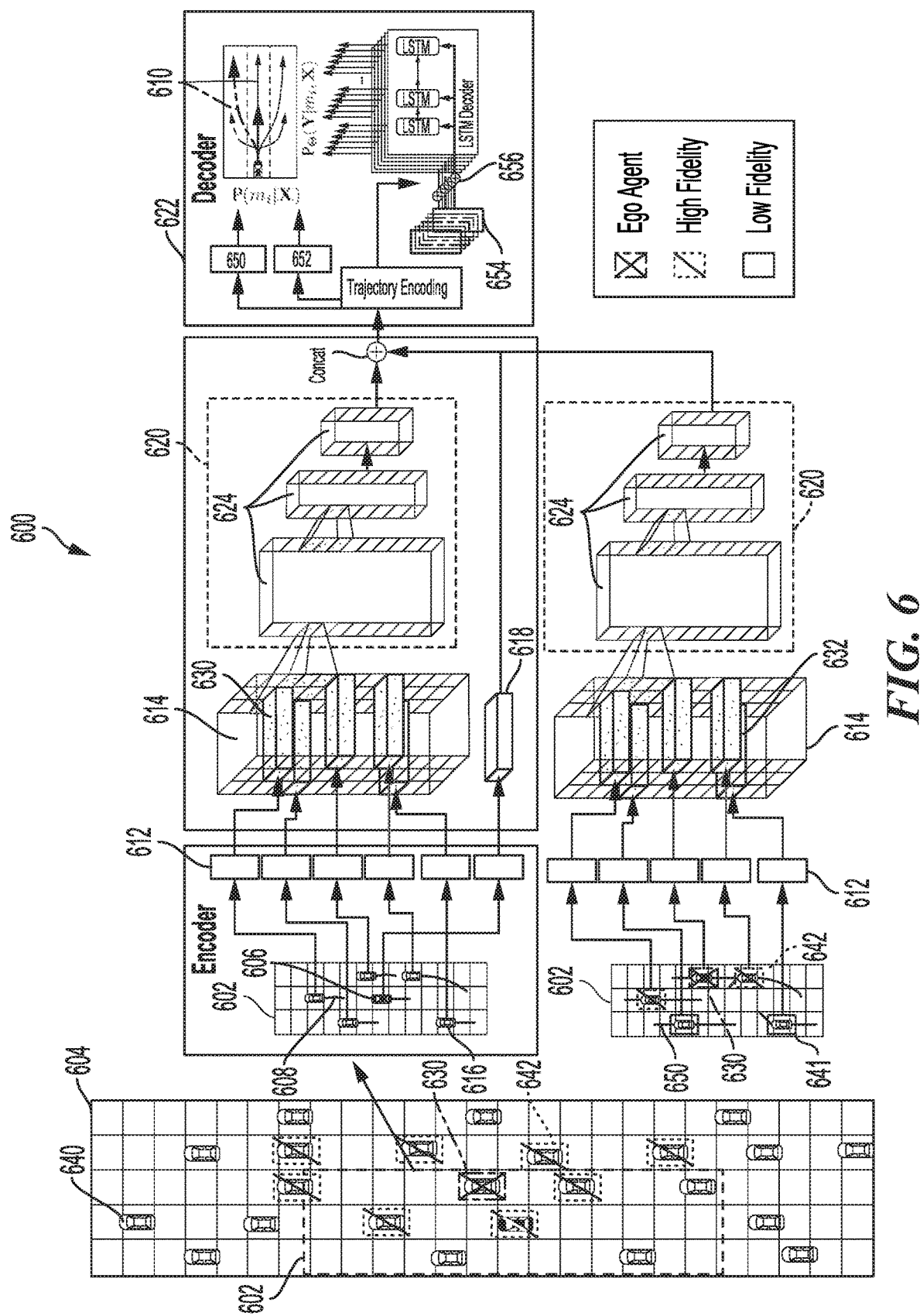
FIG. 6 illustrates an example of a model for predicting trajectories in accordance with aspects of the present disclosure.

FIG. 6 illustrates an example of a model 600 for predicting trajectories according to aspects of the present disclosure. As shown in FIG. 6, a prediction model receives information corresponding to an observation of a scene 604 at a current time step and assigns a fidelity level to each agent 640, 642. Some agents may be high fidelity agents 642 and others are low fidelity agents 640. Aspects of the present disclosure are not limited to two fidelity levels, two or more fidelity levels may be used. Multiple level 0 scenarios may be generated based on multiple level 0 trajectories of one or more high fidelity agents 642. A level 0 scenario refers to potential level 0 trajectories of each observed agent 640, 642 at the next time step. In this example, the prediction model selects one of the high fidelity agents 642 and determines level 0 trajectories 610 for a selected agent 606 based on previous observations. Human drivers may manually operate the high fidelity agents 642 and low fidelity agents 640.

To determine the level 0 trajectories 610 for the selected agent 606, the prediction model determines an area of interest 602 of the selected agent 606. The area of interest 602 may be application dependent. For example, an application may determine a distance and/or location of other agents that may be used for planning. In one example, a range for the area of interest 602 for an emergency vehicle may be larger than a range for a personal use vehicle. A sensor's range limitation may also determine a range for the area of interest 602. The agents in the area of interest 602 include high fidelity agents 642, low fidelity agents 640, and the ego agent 630. For clarity, agents 630, 640, 642 that neighbor the selected agent 606 in the area of interest 602 may be referred to as neighboring agents 616. A previous trajectory 608 (e.g., action) of each agent 606, 616 in the area of interest 602 is known from previous observations. Based on the previous trajectories 608, the model 600 determines level 0 trajectories 610 for a selected agent 606.

In one configuration, the previous trajectory 608 of each agent 606, 616 is encoded by a long-short term memory (LSTM) encoder 612. The LSTM encoder 612 may be an LSTM neural network. The output of the LSTM encoder 612 is a recent history tensor 628 summarizing a recent history of the behavior of each neighboring agent 616. The LSTM encoder 612 also outputs a vehicle dynamics tensor 618 that encodes the dynamics of the selected agent 606. The recent history tensors 628 may be stored in a three-dimensional (3D) tensor structure 614 that mimics the geometric relationship of neighboring agents 616 in relation to the selected agent 606.

The recent history tensors 628 in the 3D tensor structure 614 are processed by multiple layers 624 of a convolutional neural network (CNN) 620. The output of the CNN 620 is a social context tensor that represents statistics describing the state of the local environment. Specifically, the recent history tensors 628 summarize a recent history of agents 608 as vectors encoded by the LSTM encoders 612. The recent history tensors 628 are placed in the 3D tensor structure 614 according to their location in the scene, thereby, capturing geometrically the interaction between vehicles. The prediction tensors 632 are different from the recent history tensors 628. The prediction tensors 632 are vectors encoding level k (k=0 to K) predictions into vectors.

For level 0 predictions, the social context output is combined with the vehicle dynamics tensor 618 of the selected agent 606. For level 1 predictions, three vectors are concatenated: the social context vectors generated from the CNN 620 for level 0 and level 1; and the vehicle dynamics tensor 618 (e.g., vector). The combination of the social context output and the vehicle dynamics tensor 618 of the selected agent 606 is input to a decoder neural network 622.

The decoder neural network 622 generates the predictive distribution for future motion over a set of future frames. The inherent multi-modality of driver behavior is addressed by predicting the distribution for various maneuver classes along with the probability for each maneuver class. In one configuration, the maneuver classes include lateral and longitudinal maneuver classes.

As shown in FIG. 6, the decoder neural network 622 receives a trajectory encoding. The decoder neural network 622 includes two softmax layers (lateral softmax layer 650 and longitudinal softmax layer 652). The lateral softmax layer 650 outputs the lateral maneuver probability ($P(m_t|X)$) and the longitudinal softmax layer 652 outputs the longitudinal maneuver probability. The longitudinal and lateral maneuver probabilities may be multiplied to determine a maneuver distribution ($P(m_t|X)$). $P(\ )$ is a probability distribution conditioned over a history of trajectories X and maneuvers $m_i$.

An LSTM decoder generates parameters of a bivariate Gaussian distribution over $t_f$ frames to provide the predictive distribution for vehicle motion. The LSTM decoder generates provides maneuver specific distributions. That is, the LSTM decoder generates a distribution over the level 0 trajectories 610. The distribution provides a probability for each level 0 trajectory 610. The decoder neural network 622 also generates a shape (e.g., path) of each level 0 trajectory 610. The process for determining the level 0 trajectories 610 is repeated for each high fidelity agent 642 in the scene 604. The level 0 trajectories 610 do not provide information for future interactions between the agents 606, 616 in the area of interest 602. That is, the level 0 trajectories 610 do not provide information for level 1 trajectories of the neighboring agents 616.

As shown in FIG. 6, the trajectory encoding is concatenated with the maneuver encodings 654 via a concatenator 656. Specifically, the trajectory encoding is concatenated with one vector corresponding to a lateral maneuver class and one vector corresponding to a longitudinal maneuver. The concatenated encodings are input to an LSTM decoder to obtain maneuver specific distributions $P_\Theta(Y|m_i, X)$, where $P(\ )$ is a probability distribution over predicted trajectory Y (a sequence coordinates of future locations), conditioned over a history of trajectories X and maneuvers $m_i$. The LSTM decoder outputs a mean and covariance of a Gaussian distribution ($\Theta$) over $t_f$ frames, where $t_f$ is a number of future frames.

The maneuver encodings are obtained from maneuver classes. As discussed, the maneuver classes are based on lateral and longitudinal maneuvers. The lateral maneuvers include a left lane change, right lane change, and a lane keeping maneuver. The left and right lane changes may vary with regard to the actual cross over. As such, two or more vectors may be defined for each of the left and right lane changes. The longitudinal maneuvers may be split into normal driving and braking.

After determining the level 0 trajectories 610 for each high fidelity agent 642, the model 600 may be used to determine level 1 trajectories. Specifically, the level 0 trajectories 610 are determined for each high fidelity agent 642 in an area of interest 602 of the ego agent 630. Each high fidelity agent 642 may be used as a selected agent 606. After determining all level 0 trajectories, the model determines level 1 trajectories for agents 641, 642 surrounding each selected agent 606. In a first iteration, level 1 trajectories are computed agents 641, 642 surrounding each selected agent 606. In the kith iteration, level k trajectories are computed for agents 641, 642 surrounding each selected agent 606.

For level 0, the previous trajectory 608 of each neighboring agent 616 is encoded by the LSTM encoder 612. In one configuration, for the level 1 trajectories, only the level 0 prediction trajectories are encoded. In another configuration, for the level 1 trajectories, instead of using the previous trajectory 608, a constant velocity model is used for the low fidelity agents 640.

Similar to determining level 0 trajectories, for level 1 trajectories, the prediction tensors 632 of the neighboring agents 616 are stored in the 3D tensor structure 614. The prediction tensors 632 in the 3D tensor structure 614 are processed by multiple layers 624 of the CNN 620. The weights of the multiple layers 624 differ between level 1 and level 0. For the level 1 trajectories, social context output of the CNN 620 is combined with the level 0 social context output and the vehicle dynamics tensor 618 of the selected agent 606. The combination is input to a decoder neural network 622 and generates a distribution over the level 1 trajectories. The distribution provides a probability for each level 1 trajectory. The decoder neural network 622 also generates a shape (e.g., path) of each level 1 trajectory.

The process of model 600 may be repeated up to level K. The level K predictions are combined with the social context output and the vehicle dynamics tensor 618 of the selected agent 606. The model 600 is not limited to the model 600 of FIG. 6. Other models may be used for behavior prediction. The other models would generate a level 0 prediction and use recursion.

According to another aspect of the present disclosure, the recursive multi-fidelity predictions consider gap-threading maneuvers. FIGS. 7A, 7B, 7C, and 7D illustrate examples of recursive multi-fidelity predictions using gap-threading maneuvers. According to aspects of the present disclosure.

Figure 7A:
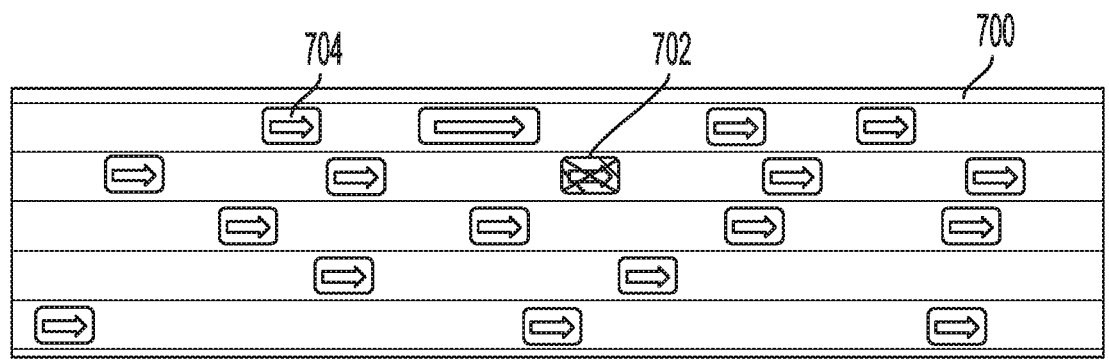
FIGS. 7A, 7B, 7C, and 7D illustrate examples of recursive multi-fidelity predictions using gap-threading maneuvers in accordance with aspects of the present disclosure.

As shown in FIG. 7A, at a first time step, a prediction model receives information corresponding to an observation of a scene 700. The scene 700 may be observed via one or more sensors of the ego agent 702, such as a LIDAR sensor, RADAR sensor, camera, and/or another type of sensor. Based on the observation, the prediction model identifies the location of other objects in the scene, such as other agents 704. The observation may also identify each agent's 704 direction of travel (identified via the arrow in FIG. 7A). An environment model is updated based on the observed scene 700.

Figure 7B:
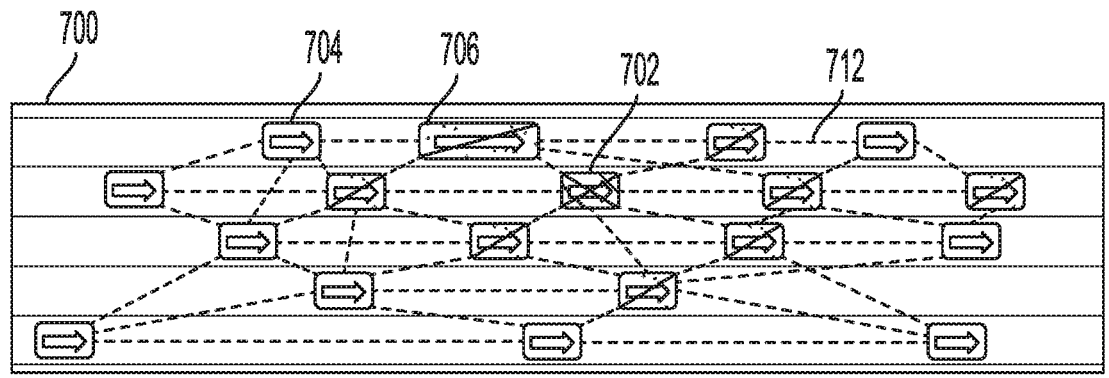

As shown in FIG. 7B, after observing the scene 700, the prediction model generates an interaction graph based on geometric and map-based pairwise features. Directed edges (not shown in FIG. 7B) encode a direction of influence between two agents. A connection 712 between agents 702, 704 identifies a constraint between two agents. For example, a connection 712 is established between the ego agent 702 and each adjacent agent 706. The connection 712 identifies a relationship between the ego agent 702 and each adjacent agent 706, such that the action of the ego agent 702 may influence an action of each adjacent agent 706. Additionally, an action of an adjacent agent 706 may influence an action of the ego agent 702.

Figure 7C:
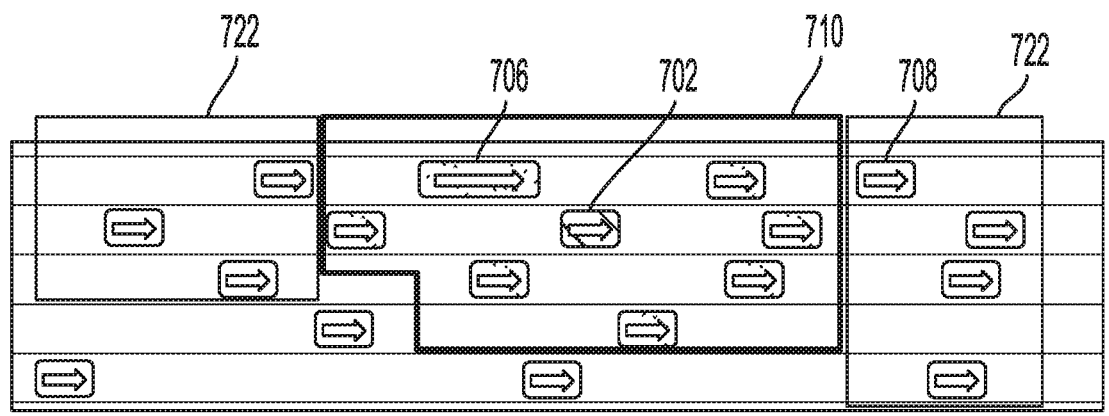

After generating the interaction graph, the scene 700 is partitioned into different fidelity neighborhoods. FIG. 7C illustrates an example of fidelity neighborhoods. The high fidelity neighborhood may be centered on the ego agent 702. For example, each adjacent agent 706 may be in the high fidelity neighborhood 710. Non-adjacent agents 708 may be assigned to a low fidelity neighborhood 722. For clarity, FIG. 7C does not illustrate each low fidelity neighborhood 722.

Figure 7D:
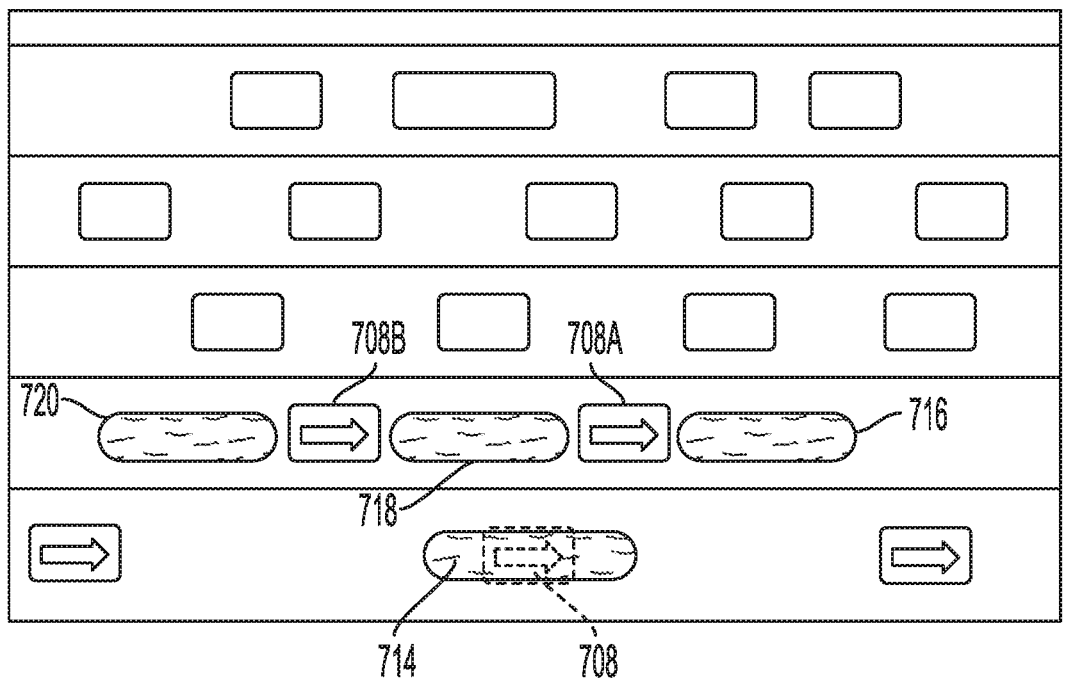

An applicable policy is identified for each agent 706, 708. FIG. 7D illustrates an example of identified policies 714, 716, 718, 720 of an agent 708. Each policy may be defined by local neighborhood and roadway geometry. For example, as shown in FIG. 7D, the agent 708 may maintain its current trajectory 714, move to a gap 716 in front of a first agent 707A, move into a gap 718 between the first agent 707A and a second agent 707B, or move into a gap 720 behind the second agent 707B. The gaps 716, 718, 720 and the current trajectory 714 may be referred to as policies.

In one configuration, a policy likelihood is determined for each policy corresponding to each agent. The policy likelihood determines the probability of an agent executing a policy. The likelihood of executing a policy may be based on a cost of a trajectory, a similarity of a trajectory to cached trajectories from previous time steps, prior actions of the agent, map location, neighbor constellation, etc. In one configuration, the previous actions of the agent are used to determine the likelihood of executing the policy. For example, the agent's movement towards a direction or the agent's turn signal may be used to determine the likelihood of executing the policy.

Figure 8:
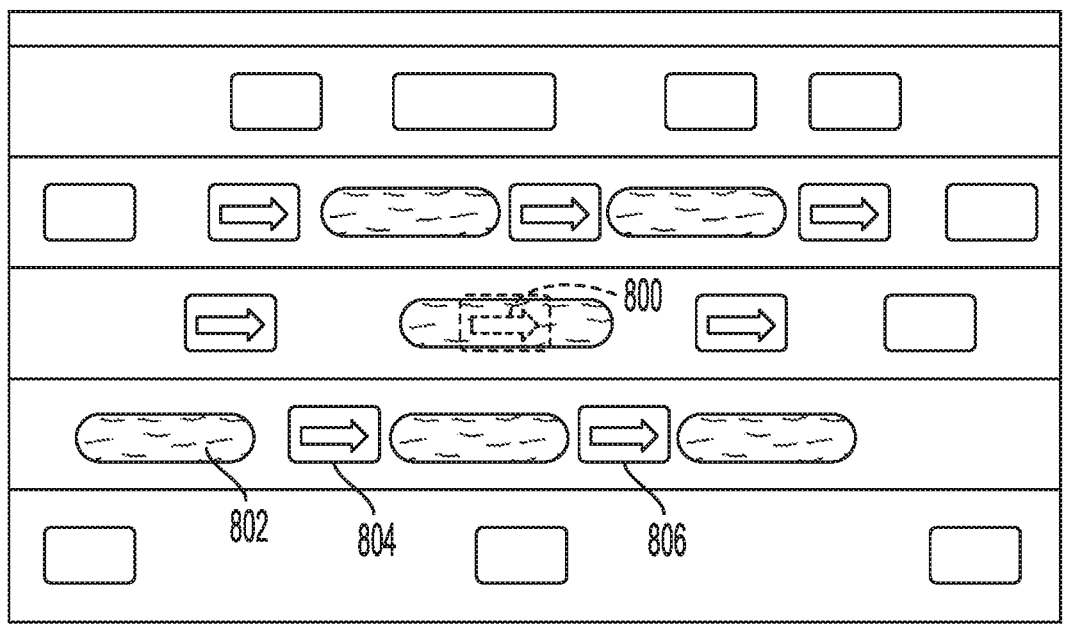
FIG. 8 illustrates an example of determining a most likely policy in accordance with aspects of the present disclosure.

FIG. 8 illustrates an example of determining a most likely policy according to aspects of the present disclosure. As shown in FIG. 8, different policies 802 are determined for a target agent 800. In this example, the agent 800 may have activated its right turn signal at a previous time step. Based on the activated turn signal, the prediction model may determine that moving to a gap between a first agent 804 and a second agent 806 is the most likely policy.

Based on an order of priority determined from an interaction graph, one or more policies may be sampled for each agent. The number of samples may be dependent on that agent's fidelity level and the maneuver distribution. When more than one policy is sampled for an agent, a scenario tree is branched. The branching may change the interaction graph. A change in the interaction graph causes a change in the priority order. Each path from a root to a leaf node of a scenario tree represents a full set of samples policies, where one policy is sampled for each car. The predictions in a leaf node are therefore conditioned on the full chain of nodes from root to that leaf's parent node.

Figure 9A:
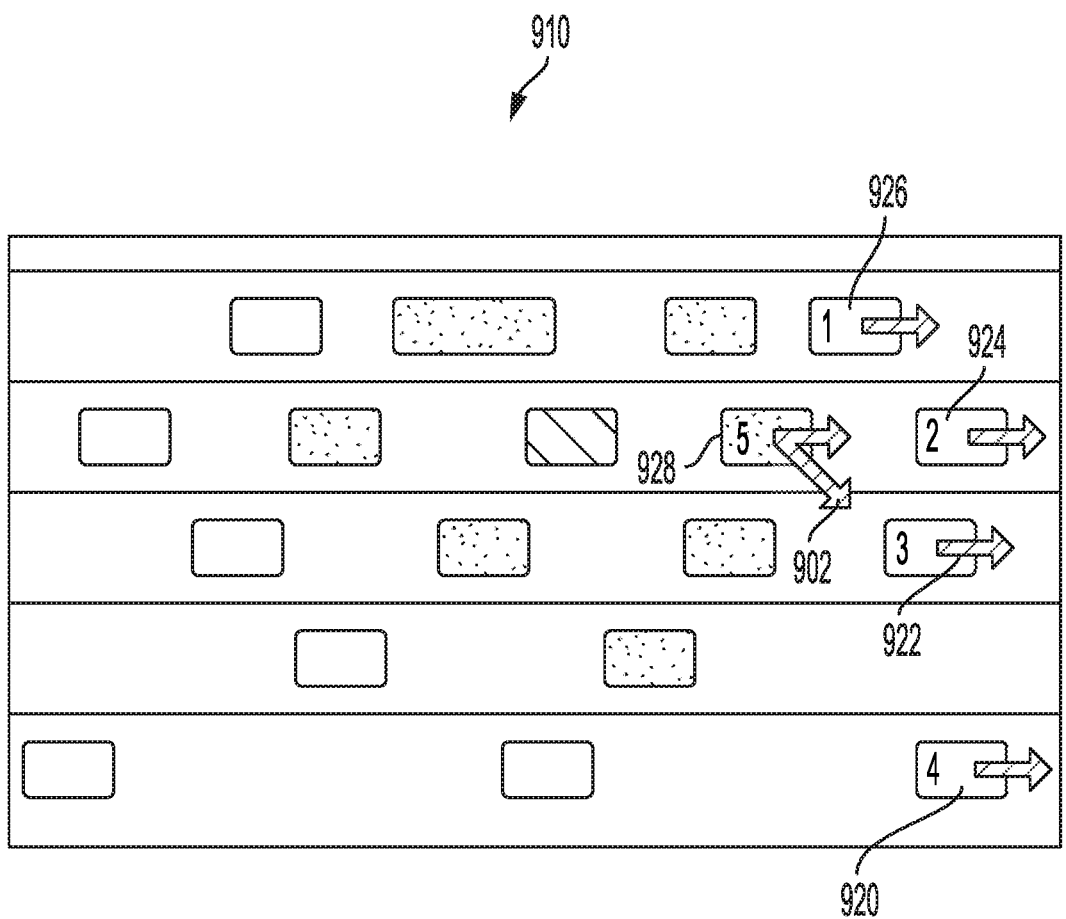
FIGS. 9A and 9B illustrate examples of determining policies in accordance with aspects of the present disclosure.

FIG. 9A illustrates an example of determining policies 902 for agents 920, 922, 924, 926, 928 according to aspects of the present disclosure. As shown in FIG. 9A, at a root node 910 of a scenario tree, a policy 902 is determined for each agent 920, 922, 924, 926, 928 in order of priority. For example, the policies 902 may be determined in order of a number (e.g., 1-5) corresponding to each agent 920, 922, 924, 926, 928. In this example, two policies are generated for a fifth agent 928. The number of policies for the fifth agent 928 may be greater than a number of policies for the other agents 920, 922, 924, 926 because a high fidelity level was assigned to the fifth agent 926.

Figure 9B:
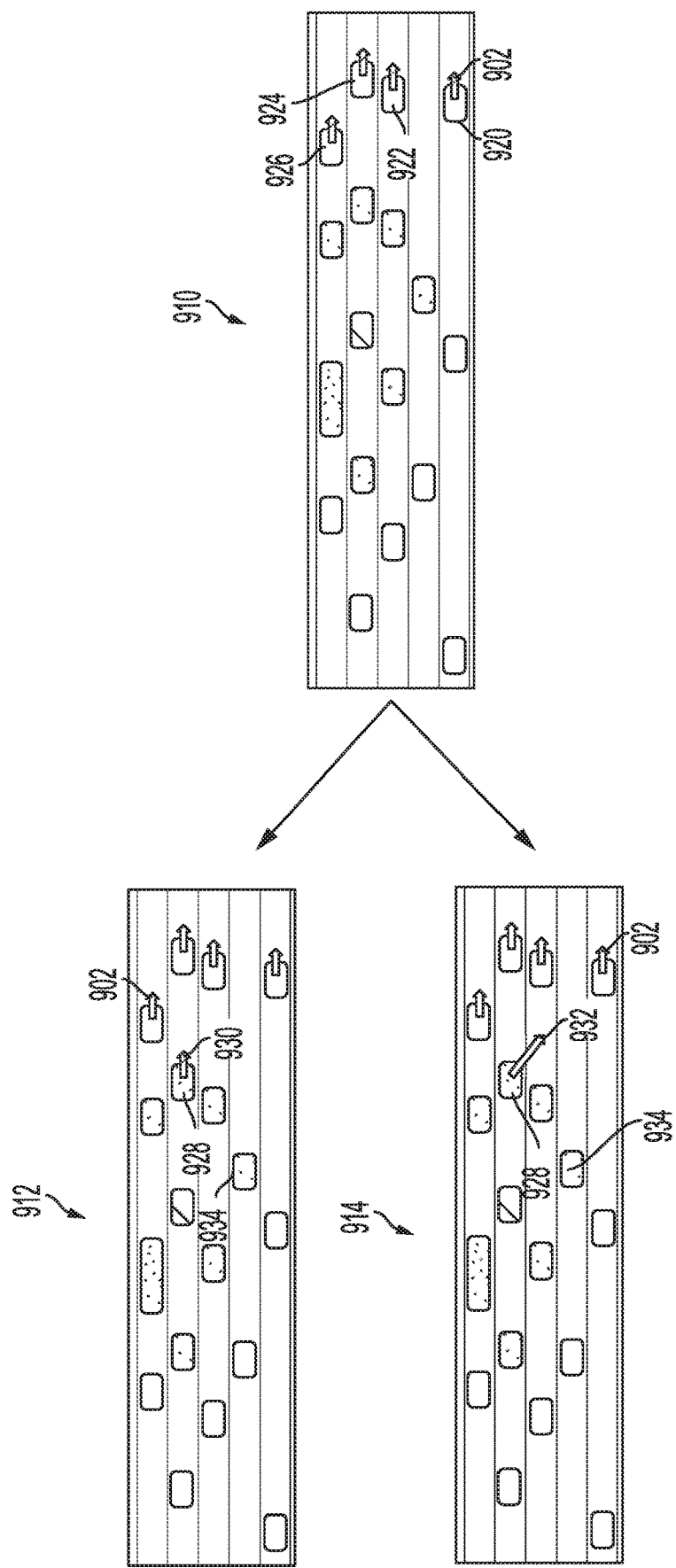

In response to the fifth agent 928 having more than one policy 902, a scenario tree is branched. FIG. 9B illustrates an example of branching nodes of a scenario tree according to aspects of the present disclosure. As shown in FIG. 9B, a root node 99 of the scenario tree includes the policies 902 for a set of agents 920, 922, 924, 926. Additionally, a first leaf 912 includes the policies 902 for the set of agents 920, 922, 924, 926 as well as a first policy 930 for the fifth agent 928. A second leaf 914 includes the policies 902 for the set of agents 920, 922, 924, 926 as well as a second policy 932 for the fifth agent 928. Policies for the other agents 934 may be generated in the first and second leaves 912, 914. The first and second leaves 912, 914 may branch when more than one policy is generated for one of the other agents 934.

According to aspects of the present disclosure, a hybrid approach may be used for behavior prediction. The hybrid approach may use a model similar to the model of FIG. 6. For the hybrid approach, level 0 policies are determined for a set of agents in a neighborhood. The actions of the set of agents may not have a substantial impact on the ego agent. Based on the level 0 policies, level 1 policies are determined for each agent based on priority.

Figure 10:
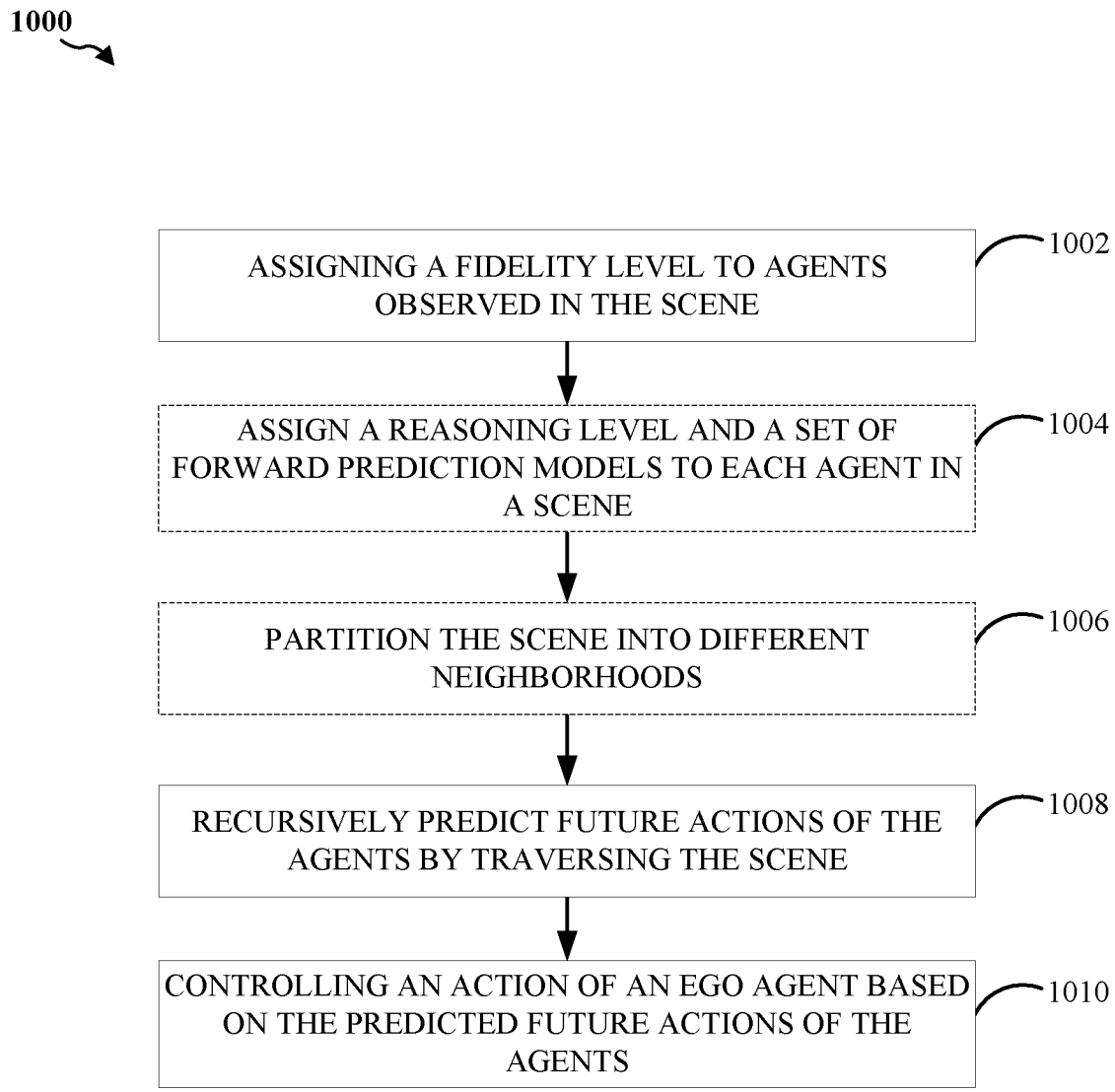
FIG. 10 illustrates a method for predicting a future action of agents in a scene in accordance with aspects of the present disclosure.

FIG. 10 illustrates a method 1000 for predicting a future action of agents in a scene according to an aspect of the present disclosure. As shown in FIG. 10, at a first block 1002, a prediction model assigns a fidelity level to agents observed in the scene. The fidelity level may refer to an agent's significance in the scene. In one configuration, computational resources are biased towards agents that are deemed most significant. The scene may be observed via one or more sensors, such as a LIDAR sensor, RADAR sensor, camera, and/or another type of sensor. Based on the observation, the prediction model identifies the location of other objects in the scene. The observation may also identify each agent's direction of travel.

In an optional configuration, at block 1004, a reasoning level and a set of forward prediction models are assigned to each agent in a scene. The forward prediction models may be referred to as atomic models. The reasoning level of an agent may be an integer greater than or equal to zero. Each forward prediction model of an agent's assigned set of forward prediction models corresponds to a specific reasoning level greater than or equal to zero and less than or equal to the agent's assigned reasoning level. A given agent may have no more than one assigned atomic prediction model for each level.

For example, if an agent is assigned a reasoning level of one, the agent may include a level 0 forward prediction model and/or a level 1 forward prediction model. The level 0 forward prediction model may generate a level 0 motion hypothesis (e.g., recursion level 0) for the agent. The level 1 forward prediction model may generate a level 1 motion hypothesis (e.g., recursion level 1) for the agent. That is, each forward prediction model of the set of forward prediction models corresponds to a recursion level determined based on the reasoning level.

In an optional configuration, at block 1006, the prediction model partitions the scene into different neighborhoods. Each neighborhood may be assigned a different fidelity. The fidelity may be based on a proximity to the ego agent. For example, a high fidelity neighborhood may be centered on the ego agent. The fidelity of the agents may be based on a fidelity of a corresponding neighborhood.

At block 1008, the prediction model recursively predicts future actions of the agents by traversing the scene. For example, for each agent that has an assigned level 0 forward prediction model, the recursive reasoning scheme generates a level 0 motion hypothesis using the assigned level 0 forward prediction model. Then, for each agent that has an assigned level 1 forward prediction model, the prediction model generates a level 1 motion hypothesis using the assigned level 1 forward prediction model.

A subset of the level 0 motion hypotheses of other agents may be used as input to any of the level 1 prediction models. This process may be repeated, such that each successive set of motion hypotheses (level k) may be conditioned on the highest level (up to k−1) previously computed motion hypothesis of each agent in a subset of the other agents in the scene. As discussed, a different forward prediction model (e.g., level 0, level 1, etc.) may be used at each recursion level.

In one configuration, the future actions are recursively predicted based on an initial trajectory comprising historical observations of each agent. That is, an input to the prediction model may be a representation of the history of a scene. In another configuration, the future actions are recursively predicted based on an applicable policy for each agent. The policy may be based on a corresponding neighborhood of the agent and a scene structure. The scene structure may refer to the roadway geometry.

Finally, at block 1010, the prediction model controls an action of an ego agent based on the predicted future actions of the agents. For example, the prediction model may alter a route, adjust a speed, or control another action. The prediction model may be a component of the ego agent.

In some aspects, the method 1000 may be performed by the SOC 100 (FIG. 1). That is, each of the elements of the method 1000 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method comprising:
assigning a fidelity level of a plurality of fidelity levels to each agent of a plurality of agents observed in a scene;
recursively predicting future actions of the plurality of agents by traversing the scene, a different forward prediction model being used at each recursion level to predict the future actions of each agent associated with one fidelity level of the plurality of fidelity levels; and
controlling an action of an ego agent based on the predicted future actions of the plurality of agents.

2. The method of claim 1, further comprising assigning a reasoning level and a set of forward prediction models to each agent in the scene.

3. The method of claim 2, in which each forward prediction model of the set of forward prediction models corresponds to a recursion level determined based on the reasoning level.

4. The method of claim 1, further comprising recursively predicting the future actions based on an initial trajectory comprising historical observations of each agent.

5. The method of claim 1, further comprising partitioning the scene into different neighborhoods.

6. The method of claim 5, in which each fidelity level is assigned based on a fidelity of a neighborhood.

7. The method of claim 1, in which the future actions are recursively predicted based on a policy associated with each agent, and each policy is based on both a neighborhood of an associated agent and a scene structure.

8. An apparatus comprising:
a memory; and
at least one processor coupled to the memory, the at least one processor configured:
to assign a fidelity level of a plurality of fidelity levels to each agent of a plurality of agents observed in a scene;
to recursively predict future actions of the plurality of agents by traversing the scene, a different forward prediction model being used at each recursion level to predict the future actions of each agent associated with one fidelity level of the plurality of fidelity levels; and
to control an action of an ego agent based on the predicted future actions of the plurality of agents.

9. The apparatus of claim 8, in which the at least one processor is further configured to assign a reasoning level and a set of forward prediction models to each agent in the scene.

10. The apparatus of claim 9, in which each forward prediction model of the set of forward prediction models corresponds to a recursion level determined based on the reasoning level.

11. The apparatus of claim 8, in which the at least one processor is further configured to recursively predict the future actions based on an initial trajectory comprising historical observations of each agent.

12. The apparatus of claim 8, in which the at least one processor is further configured to partition the scene into different neighborhoods.

13. The apparatus of claim 12, in which each fidelity level is assigned based on a fidelity of a neighborhood.

14. The apparatus of claim 8, in which the future actions are recursively predicted based on a policy associated with each agent, and each policy is based on both a neighborhood of an associated agent and a scene structure.

15. A non-transitory computer-readable medium having program code recorded thereon, the program code executed by a processor and comprising:
program code to assign a fidelity level of a plurality of fidelity levels to each agent of a plurality of agents observed in a scene;
program code to recursively predict future actions of the plurality of agents by traversing the scene, a different forward prediction model being used at each recursion level to predict the future actions of each agent associated with one fidelity level of the plurality of fidelity levels; and
program code to control an action of an ego agent based on the predicted future actions of the plurality of agents.

16. The non-transitory computer-readable medium of claim 15, in which the program code further comprises program code to assign a reasoning level and a set of forward prediction models to each agent in the scene.

17. The non-transitory computer-readable medium of claim 16, in which each forward prediction model of the set of forward prediction models corresponds to a recursion level determined based on the reasoning level.

18. The non-transitory computer-readable medium of claim 15, in which the program code further comprises program code to recursively predict the future actions based on an initial trajectory comprising historical observations of each agent.

19. The non-transitory computer-readable medium of claim 15, in which the program code further comprises program code to partition the scene into different neighborhoods.

20. The non-transitory computer-readable medium of claim 19, in which each fidelity level is assigned based on a fidelity of a neighborhood.

21. The non-transitory computer-readable medium of claim 15, in which the future actions are recursively predicted based on a policy associated with each agent, and each policy is based on both a neighborhood of an associated agent and a scene structure.

22. An apparatus comprising:
means for assigning a fidelity level of a plurality of fidelity levels to each agent of a plurality of agents observed in a scene;
means for recursively predicting future actions of the plurality of agents by traversing the scene, a different forward prediction model being used at each recursion level to predict the future actions of each agent associated with one fidelity level of the plurality of fidelity levels; and
means for controlling an action of an ego agent based on the predicted future actions of the plurality of agents.

23. The apparatus of claim 22, further comprising means for assigning a reasoning level and a set of forward prediction models to each agent in the scene.

24. The apparatus of claim 23, in which each forward prediction model of the set of forward prediction models corresponds to a recursion level determined based on the reasoning level.

25. The apparatus of claim 22, in which the means for recursively predicting the future actions comprises means for recursively predicting the future actions based on an initial trajectory comprising historical observations of each agent.

26. The apparatus of claim 22, further comprising means for partitioning the scene into different neighborhoods.

27. The apparatus of claim 26, in which each fidelity level is assigned based on a fidelity of a neighborhood.

28. The apparatus of claim 22, in which the future actions are recursively predicted based on a policy associated with each agent, and each policy is based on both a neighborhood of an associated agent and a scene structure.

\* \* \* \* \*